March 1, 1927.

J. H. DEAN 1,619,461

TOBACCO STEMMING AND BOOKING MACHINE

Filed March 23, 1925

Inventor
John H. Dean
By Frank E. Liverance, Jr.
Attorney

Fig.2.

March 1, 1927.  
J. H. DEAN  
1,619,461  
TOBACCO STEMMING AND BOOKING MACHINE  
Filed March 23, 1925     9 Sheets-Sheet 3

Fig.3.

Inventor  
John H Dean  
By Frank E. Liverance, Jr.  
Attorney

March 1, 1927.  
J. H. DEAN  
1,619,461  
TOBACCO STEMMING AND BOOKING MACHINE  
Filed March 23, 1925   9 Sheets-Sheet 5

Inventor  
John H. Dean  
By Frank E. Liwarre, Jr.  
Attorney

J. H. DEAN 1,619,461

TOBACCO STEMMING AND BOOKING MACHINE

Filed March 23, 1925    9 Sheets-Sheet 9

Inventor
John H. Dean
By Frank E. Liverance Jr.
Attorney.

Patented Mar. 1, 1927.

1,619,461

UNITED STATES PATENT OFFICE.

JOHN H. DEAN, OF GRAND RAPIDS, MICHIGAN.

TOBACCO STEMMING AND BOOKING MACHINE.

Application filed March 23, 1925. Serial No. 17,537.

This invention relates to a tobacco stemming and booking machine, being particularly designed for the ready and effective removal of the stems of tobacco leaves from the said leaves and the placing together or booking of a plurality of the stemmed leaves in superimposed relation, until such time as a book of leaves are to be removed from the machine. The invention consists of many novel constructions, combinations and arrangements of parts for the effective stemming and booking of tobacco, all of which will appear fully and in detail as understanding of the invention is had from the following description, taken in connection with the accompanying drawings, in which.

Like reference characters refer to like parts in the different figures of the drawings.

Figures 15, 16:
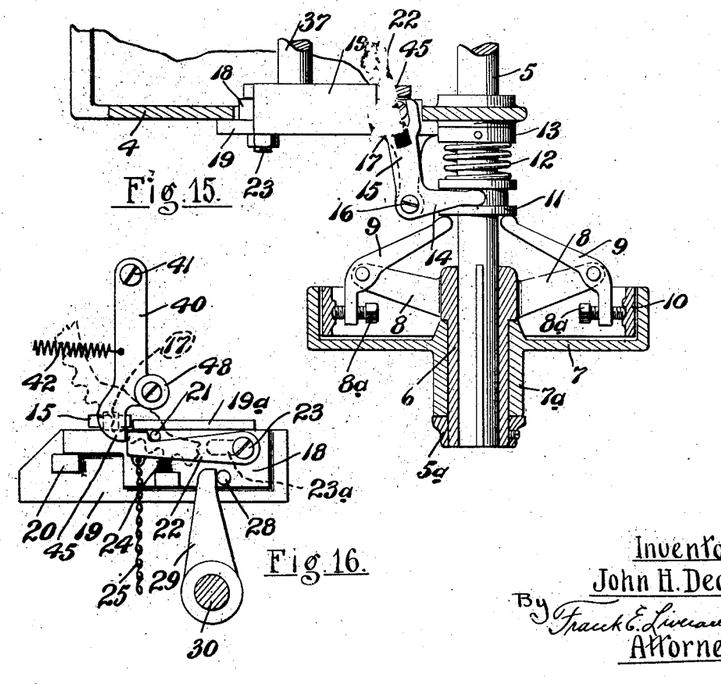
Fig. 15 is a fragmentary horizontal section through the clutch mechanism and parts associated therewith.
Fig. 16 is an elevation of the automatic and manually operable means for controlling the clutch mechanism.

In the construction of the machine a pedestal support 1 with a base 2 is provided, at its upper end being formed with a table 3 on which the supporting frame for the mechanism is fixed, this frame being indicated as a whole at 4. A drive shaft 5 is mounted horizontally on and passes through the frame 4, having a sleeve 6 keyed at one end on which a wheel 7 is loosely mounted, the hub $7^a$ of which is held between a shoulder on the sleeve 6 and a collar $5^a$ secured on the outer end of the sleeve. Arms 8 extend outwardly from the inner end of the sleeve at the outer ends of which arms or levers 9 are pivotally mounted, the outer ends of the levers carrying adjusting screws $8^a$ the ends of which come against the inner sides of a band 10 located on the inner sides of the flange of the wheel 7, as shown in Fig. 15. Wheel 7 is adapted to be belt driven and may run loosely on the sleeve 6 except when the levers 9 are actuated to press the band into engagement with the wheel whereupon the shaft is driven through the keyed connection of sleeve 6 thereto.

At their opposite ends levers 9 bear against a collar 11 on the shaft which is pressed outwardly against the ends of the levers by a strong spring 12 located between the collar 11 and a second collar 13 located against a side of the frame 4. With collar 11 a yoke 14 is connected forming one arm of a bell-crank lever which is completed by a second arm 15. The bell-crank lever is pivotally mounted at 16 on a supporting member extending outwardly from the side of the frame 4. The free end of arm 15 is forked to receive an upwardly projecting pin 17 which is connected with a slidably mounted block 18 mounted alongside of a relatively stationary supporting member 19, one end of the block resting on a lug 20 projecting inwardly from member 19. A latch lever 22 has a recessed upper side for the reception of a pin 21 which is secured to and extends inwardly from the member 18, which member is covered with an upper overhanging cover portion 19$^a$, as shown. The latch lever is pivotally mounted on a bolt 23 carried by the block 18 and passes through a slot 23$^a$ in member 19, thus serving as a support for the other end of the block. The latch lever is normally impelled upwardly until stopped by pin 21 by a spring 24 (see Fig. 16).

A chain 25 is connected to the lever 22 near its free end and extends downwardly nearly to the base 2, having connection to one end of a foot pedal 26 which is pivotally mounted between its ends at 27 on the base. By foot operation, the pedal may be rocked and the chain pulled to drawn the latch lever downward into free position, as will later appear allowing the block 18 to slide freely under the influence of spring 12 and a freeing of the spring to act on the collar 11 to clamp the band 10 against the wheel 7 so that shaft 5 is driven whenever wheel 7 is being driven.

Figure 2:
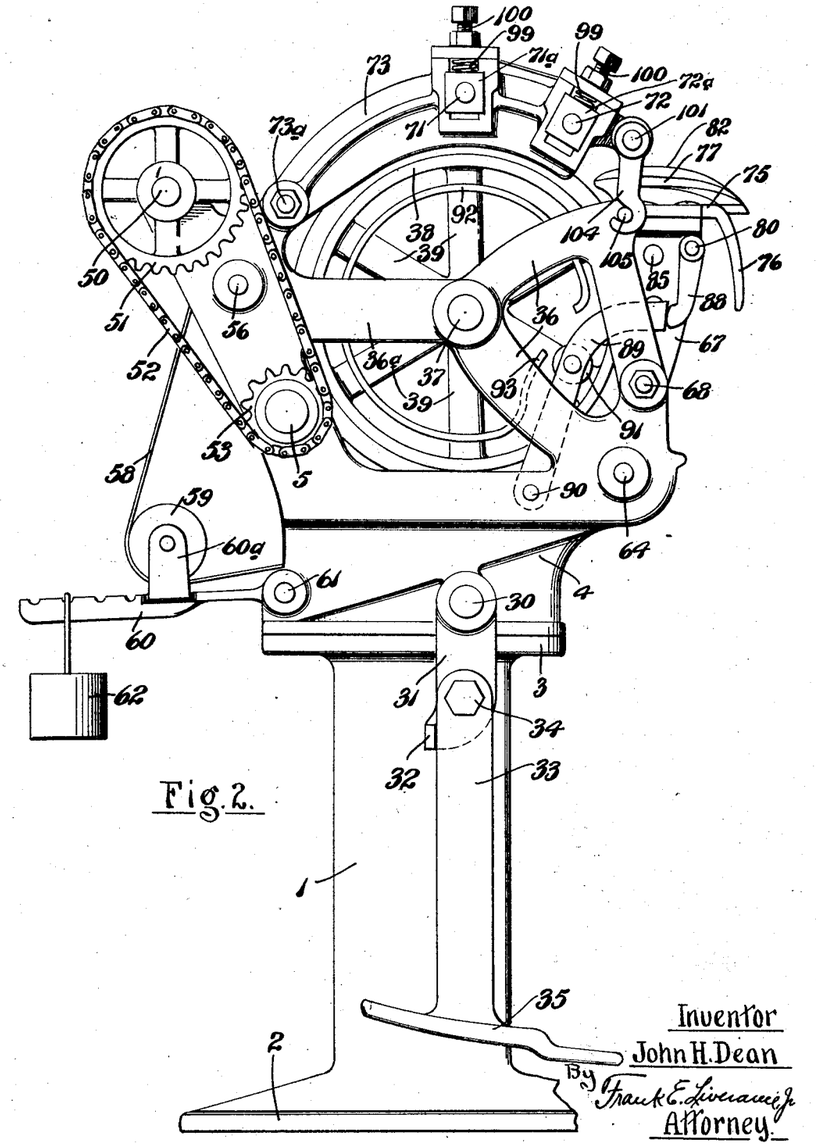
Fig. 2 is a side elevation of the machine looking at one side thereof.

A pin 28 extends from the block 18 engaging against which is an arm 29 fastened to and extending upwardly from a rock shaft 30 which is rotatably mounted horizontally in and passes through the lower part of the supporting frame 4. The arm 29 is adjacent one end of the shaft and at the opposite end a downwardly extending arm 31 is secured having an off-set at its lower end formed with a laterally projecting lug 32 which comes against one edge of a bar 33, pivotally connected to the arm 31 at 34 above the level of the lug 32. The lower end of the bar 33 is formed with a foot engaging member 35 as shown in Fig. 2. Operation of the bar 33 to the rear causes it to engage against lug 32 whereby shaft 30 is rocked with a consequent sliding of the block 18 which compresses spring 12 and frees the shaft 5 from connection to the driving wheel 7. The operator of the machine may stop its operation at any time by this foot operation of the bar 33.

The supporting frame 4 of the machine, at each side is extended upwardly and at each side includes arms 36 and 36$^a$ which join at their inner ends and make a bearing for a shaft 37 extending horizontally through and between the sides of the support 4. A relatively large drum 38 is mounted on the shaft 37, radial arms 39 extending inwardly from the inner sides of the drum at its ends and joining at their meeting ends to make hubs through which the shaft 37 passes.

A latching dog 40 is pivotally mounted at its upper end at 41 to one of the arms 36$^a$ and extends downwardly at one end of the drum, being normally drawn by spring 42 to the rear and its lower end, indicated at 45 comes directly back of the end of the latch lever 22. Normally the dog does not interfere with the free movement of the block 18 on which the lever 22 is mounted. The end of the drum adjacent which the dog 40 is located has a sprocket 46 attached thereto or integrally formed therewith and at one point on the inner side of said sprocket end of the drum a raised cam projection 47 is formed. A roller 48 is mounted on the dog 40 and rides on the inner sides of the gear end of the drum and when the cam 47 comes thereto, it rides thereover, whereupon the dog 40 is moved against the force of spring 42, the end of the dog, at 45, striking against the latch lever 22 and moving the attached block 18 so as to stop the rotation of shaft 5. It is apparent that this occurs with each rotation of the drum unless the lever 22 is held down by drawing on the chain 25 as previously described, and that after the shaft is stopped, stopping the machine, it is again set in motion by operating foot pedal 26 to free the block from the restraining influence of the dog 40 when it is moved by the roller 48 riding on the cam 47.

Figure 4:
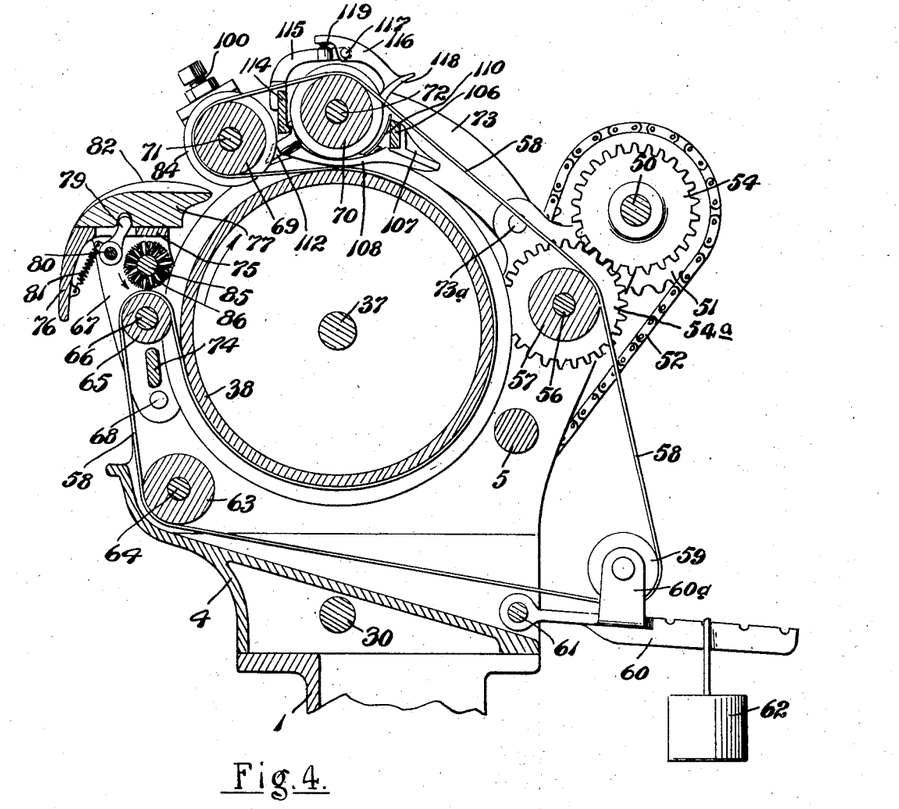
Fig. 4 is a vertical section taken from front to rear of the upper portion of the machine.
Figure 5:
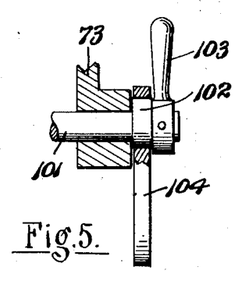
Fig. 5 is a fragmentary detail partly in section and front elevation of a locking hook connection used in the machine.
Figure 6:
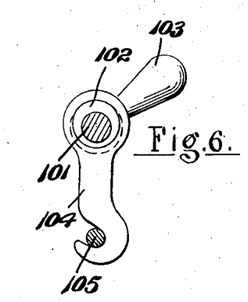
Fig. 6 is a side elevation thereof, partly in section.

At the rear upper portions of the sides of the supporting frame 4, short arms 49 extend upwardly and to the rear. A shaft 50 passes through and is rotatably mounted on said arms at one end having a sprocket wheel 51 secured thereto around which chain 52 passes, also passing around a second wheel 53 on the shaft 5 (see Fig. 2). On the shaft 50 between its ends a gear 54 and a sprocket wheel 55 are fixed, a chain 55$^a$ passing around the latter and also around the sprocket 46. Gear 54 meshes with and drives a gear 54$^a$ secured on the shaft 56 which is mounted horizontally between the sides of the frame 4 and on which a roller 57 is fixed, best shown in Fig. 4.

A plurality of endless belts 58 pass over the roller 57, leading therefrom to and around idle rollers 59 rotatably mounted on and between ears 60$^a$ which project upwardly from a member 60 pivotally mounted at 61 at its inner end to the frame 4.

The member 60 extends to the rear and on it a weight 62 is mounted, adapted to be placed at various positions, and serving to impart a desired tension to the belts.

From roller 59 the belts 58 extend forwardly under the drum 38 and pass under guiding idle roller 63 secured on a shaft 64 rotatably mounted at the lower front portion of the frame 4. The belts thence extend upwardly to and over a roller 65 on a shaft 66 which is rotatably mounted on and between sides 67 of a table carrying support to be later described, the lower ends of the sides 67 being pivotally mounted at 68 to the sides of frame 4. After passing over the roller 65, the belts pass under and around the drum 38 to the upper side thereof, under and around a roller 69 and over a second roller 70 located back of said roller 69, these rollers being secured on shafts 71 and 72 which are rotatably mounted between sides 73 of an overhanging frame, the rear ends of said sides having pivotal connection at 73ª to the sides of frame 4, as shown. This completes the traverse of the belts, the same passing from the roller 70 to roller 57 first described. In the operation of the machine the belts are driven by the drum in the direction indicated by the arrows in Fig. 4.

Figure 1:
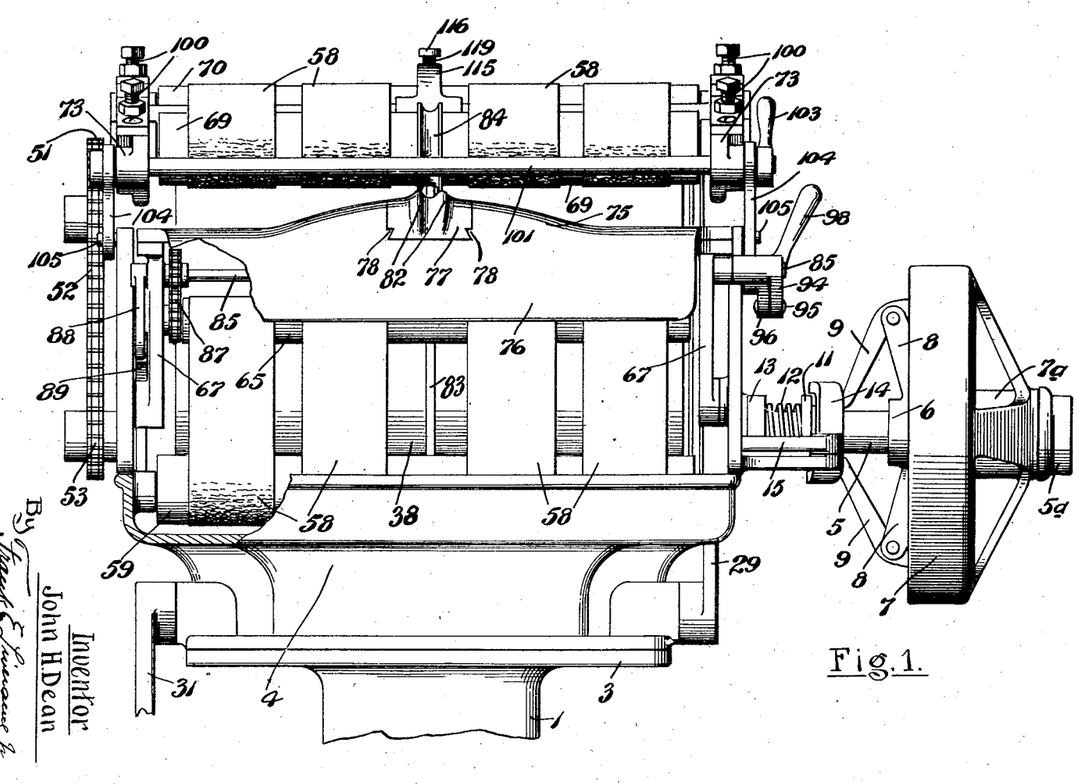
Fig. 1 is a front elevation of the upper part of the machine constructed in accordance with my invention.

A table 75 is disposed between and connected to the upper ends of the sides 67 heretofore noted and at its front edge is formed with a downwardly extending lip 76, as shown. At its central portion, the table is cut away and formed with guides for the sliding mount of a block 77, the guides therefor being shown at 78, Fig. 1. The block on its under side has a recess therein into which an arm 79 extends, the arm being secured to a shaft 80 rotatably mounted on and between the sides 67, a spring 81 being connected with the shaft and the lip 76 in such manner that the normal tendency is to move the block in a forward direction. The intermediate portion of the table 75 is raised in a gradual curve, as shown in Fig. 1, and the upper side of the block 77 where it joins with the upper surface of the table makes a smooth continuation of the surface of the table for a distance at each side and then merges in the raised ribs 82 on the upper side of the block, two of which are provided with a groove between them as shown. The table and block as thus shaped form a surface over which the tobacco leaf may be smoothly placed with the stem lying over the groove between the ribs 82.

Figure 8:
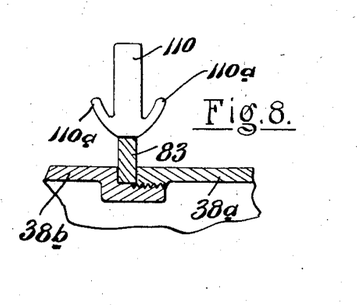
Fig. 8 is a fragmentary longitudinal section through the drum at the central portion thereof, the associated stem guide being shown in elevation.

The groove between ribs 82 is substantially midway between the ends of the table. In alinement therewith on the drum is an outwardly extending rib 83 which is clamped in place between the two halves 38ª and 38ᵇ of the drum as shown in Fig. 8. The rollers 69 and 70 at their middles are provided with grooved stemming annular projecting enlargements 84 and 84ª, the grooves lying directly over the rib 83. Above the shaft 66, a second shaft 85 is located and rotatably mounted from which over the belts 58 brushes 86 project serving to clean the belts as the same pass, the shaft 85 being rotated continuously with the operation of the machine by a chain running over suitable wheels on the ends of shafts 66 and 85. A bar 74 is disposed between the sides 67 below the roller 65 to serve as a reinforce for the table support frame, making a rigid structure for the same.

On one end of the shaft 80, a downwardly extending finger 88 is secured, the end of which bears against the end of a member 89 which is pivotally mounted at 90 to a side of the frame (see Fig. 2). A roller 91 is carried by member 89 adapted to ride on the outside of a substantially circular cam member 92 fixed at one end and rotatable with the drum 38. At one point the member 92 is inwardly depressed, as shown at 93, permitting the member 89 a rearward movement whereupon the spring 81 is free to act to move the block 77 in a forward direction, this occurring at the times that the machine is automatically stopped by disconnecting the drive wheel 7 from the shaft 5, so that the block 77 is projected forward for the easy reception of the butt ends of tobacco leaves while the machine is at rest and moved to the rear to bring the successive leaves into position to go into the machine substantially as soon as the machine is again started in operation.

Figure 3:
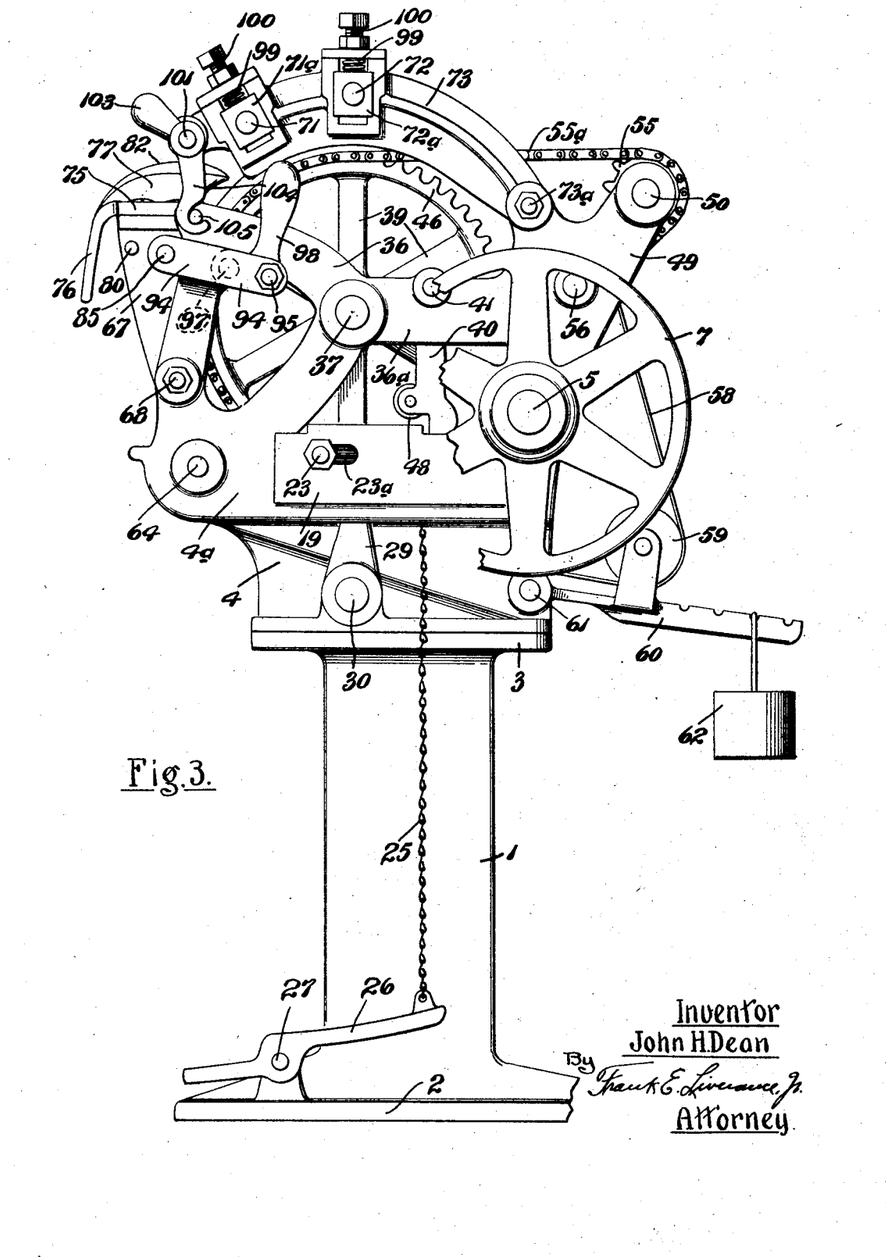
Fig. 3 is a similar elevation of the opposite side.
Figure 7:
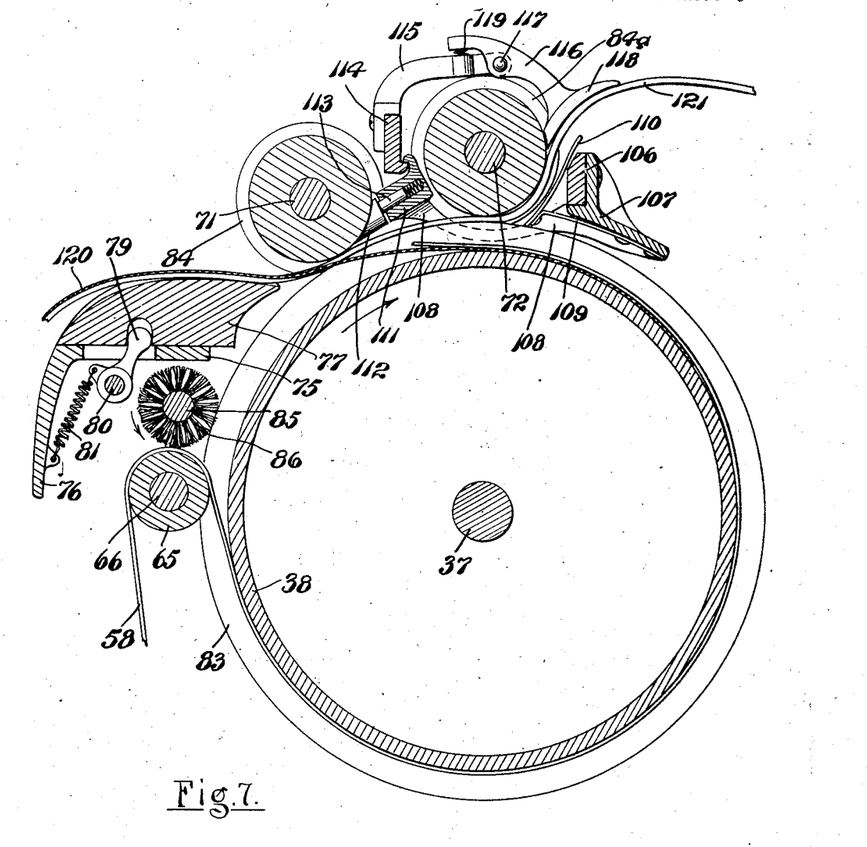
Fig. 7 is a fragmentary enlarged transverse vertical section through the booking drum and associated stemming mechanism located at the front of the machine.
Figure 9:
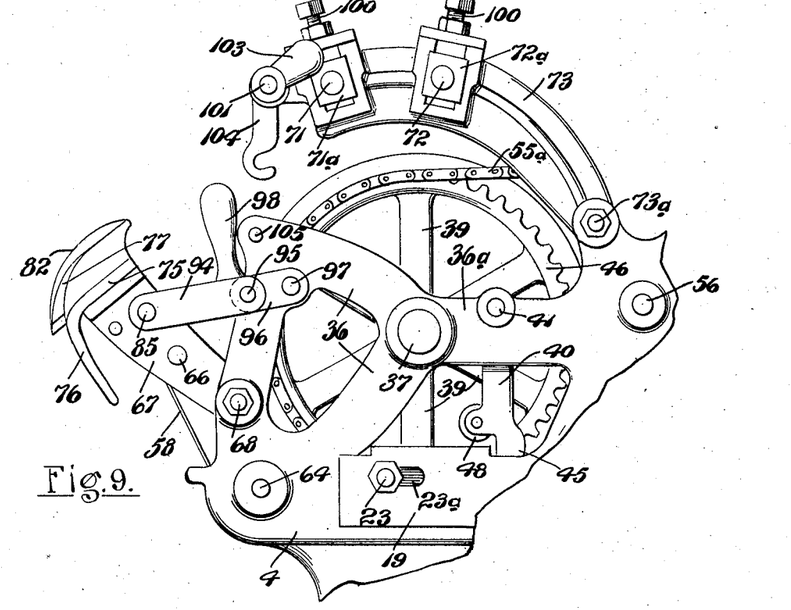
Fig. 9 is a side elevation of the upper part of the machine, showing the side shown in Fig. 3, with the parts unlatched and in a different position.
Figure 10:
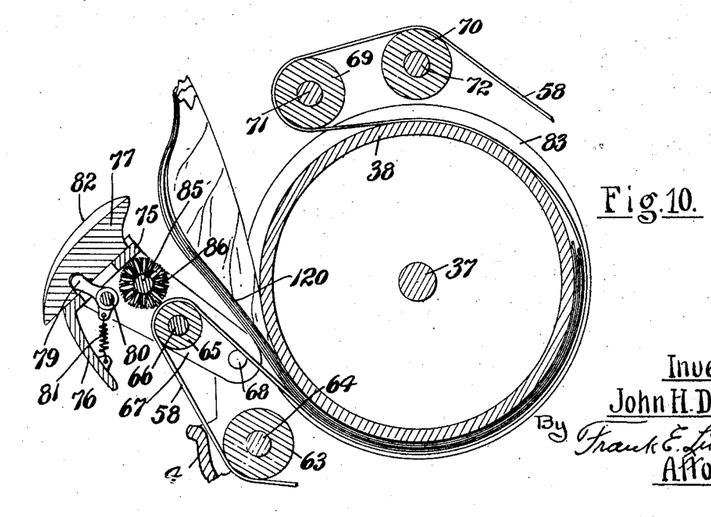
Fig. 10 is a transverse vertical section through the mechanism in the position shown in Fig. 9, in which position a book of stemmed leaves may be taken from the machine.
Figure 11:
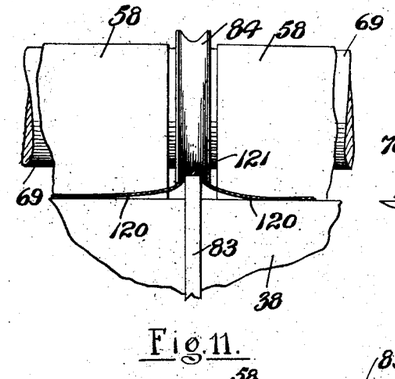
Fig. 11 is a front elevation, partly in section, showing the first stemming operation on the leaves.
Figure 12:
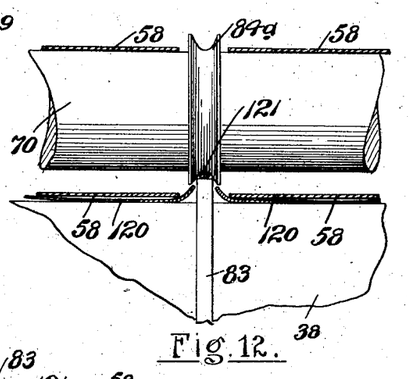
Fig. 12 is a like view showing the second stemming operation which is an auxiliary operation to insure complete stemming should the first operation be incomplete for any reason.
Figure 13:
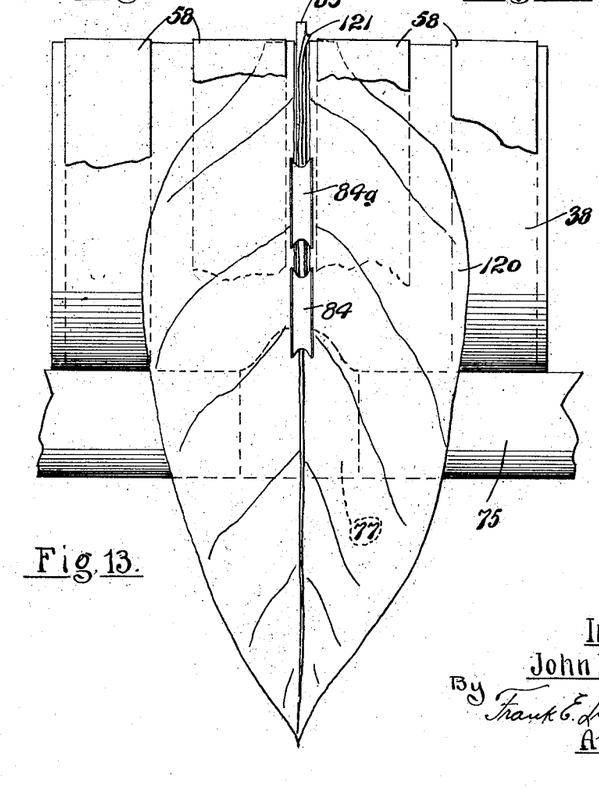
Fig. 13 is a framentary plan view showing the relation of the booking drum and stemming rollers with respect to a tobacco leaf feed therebetween.
Figure 14:
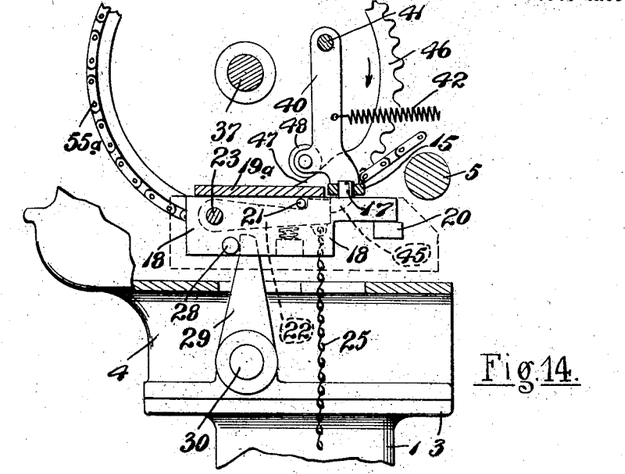
Fig. 14 is a fragmentary vertical transverse section through the upper part of the machine, the section being taken near the right end of the machine.

The table 75 and attached parts are adapted to be swung as a whole from the position shown in Fig. 7 to that shown in Fig. 9 or 10, turning about the pivots 68, and means is provided to manually effect this and for locking the table in the operative position shown in Fig. 7 or that shown in either Fig. 1 or 2. A link 94 is connected at one end to one of the members 67, for convenience being loosely connected to the end of shaft 85, and at its other end is pivotally connected at 95 to the end of a second shorter link 96 which at its opposite end has a pivotal connection at 97 to the side of the frame 4. A handle 98 is connected to and extends upwardly from the link 94 and by grasping this handle and lifting on the same, the links may be elevated at their pivotal connection at 95 and turned backwardly around pivot 97 so that the first link 94 lies alongside of the shorter link 96, as in Fig. 3, drawing the table back to operative position and locking it therein until the operation is reversed and the parts carried to the position shown in Fig. 9 or Fig. 10.

The shafts 71 and 72 on which rollers 69 and 70 are mounted at their ends are carried in boxes 71ª and 72ª slidably mounted for substantially vertical movements in the sides of the overhead frame and are normally pressed downwardly by springs 99 the pressure of which is regulated by adjusting screws 100, as shown in Fig. 2. At the front of said overhead frame a shaft 101 is rotatably mounted in and extends between the front ends of the sides 73 of the frame. At each end of the shaft an eccentric 102 is formed and at one end an operating handle 103 is fixed for manually rotating the shaft. Hooks 104 are carried on the eccentrics 102 and are adapted to engage with pins 105 on the sides of the support 4. The hooks may be readily connected with the pins 105 and then tightened thus locking the forward end of the frame 73 securely in place.

Between the sides 73 of the overhead frame, a bar 106 is secured and disposed back of the roller 70 to which a shoe 107 is permanently secured. An arm or arms 108 is attached to the shoe and extends forwardly under the roller 70 at each side of the rib 83 and an additional member 109 is attached to the shoe and extends toward the roller 70 over and against the rib 83, at its free end carrying a stem guide 110 which is located directly back of the grooved portion 84ª, spaced a short distance therefrom and extending upwardly and to the rear. The arms 108 at their front ends carry a cross connecting member 111 on which a scraper 112 to bear against the grooved surface back of the roller 84 is mounted, pins 113 from the scraper entering openings in the member 111 and being acted upon by springs to normally force the scraper forward, as shown in Fig. 7. A bar 114 is disposed over the member 111 and located between the sides 73, from which an arm 115 extends upwardly and to the rear to pass over the groove 84ª and a lever 116 is pivotally connected to the end of the arm at 117, its rear end terminating in a curved guide shoe 118 while its front end extends over the arm 115, a spring 119 being disposed between them which brings the lower point of the shoe 118 in the grooved roller 70 thereof, being used to keep said roller clear of the stems.

In the normal position of the machine at rest, the block 77 is moved to forward position, as in Fig. 2, the roller 91 being received in the recess at 93 and roller 48 riding on cam 47 to cause disconnection of the drive wheel 7 from shaft 5. The tobacco leaf is placed with its stem located over the groove in the block between the ribs 82 and the leaf is smoothed laterally over the block and adjacent upper surface of the table. When properly located, the foot pedal 26 is rocked and latch lever 22 drawn down so as to free the block 18 and permit the connection of the wheel 7 with shaft 5, starting the machine in motion. The end of the stem 121 of the leaf 120 is brought between the groove in part 84 and the rib 83 on the drum when the block 77 is moved to the rear, this happening as soon as roller 91 rides upon the member 92. The leaf is then carried into the machine under belts 58 and the coacting grooved member 84 and edges of the rib 83 act to sever the stem from the leaf, wholly or in part, any remaining connection of the stem to the leaf being separated when the second stemming part 84ª on roller 70 is reached. The scraper 112 serves to correct any tendency of the stem to follow in the grooved roller 84 and causes it to pass over rib 83 under roller 84ª. The severed stem 121 is guided upwardly and to the rear by member 110 and guide shoe 118 when the same are reached, the stemmed leaf parts lying on the drum under the belts 58 and at each side of the rib 83. After the drum has made one complete revolution, the machine is automatically stopped as before described, with the block 77 projected forwardly to receive a new leaf to be stemmed by repeating the operation. Of course, if it is desired to temporarily stop the machine during the cycle of operation, it may be done as described by operating pedal member 35 and attached bar 33 to the rear, the machine starting again as soon as released and running until the revolution of the drum has been completed.

When a sufficient number of the leaves have been stemmed, and are located one over the other on the drum 38 in a "book," they may be removed by operating handle 98 to move the table carrying frame outwardly to the position shown in Fig. 9 or 10, this opening the front of the machine for the removal of the leaves, as is obvious. After removal of the book of leaves, the machine may be returned to original position and is ready for stemming a succeeding pack or book of leaves in the same manner as before. In Fig. 9 the upper form is shown elevated which may be done when desired for cleaning the machine.

Figures 17, 19:
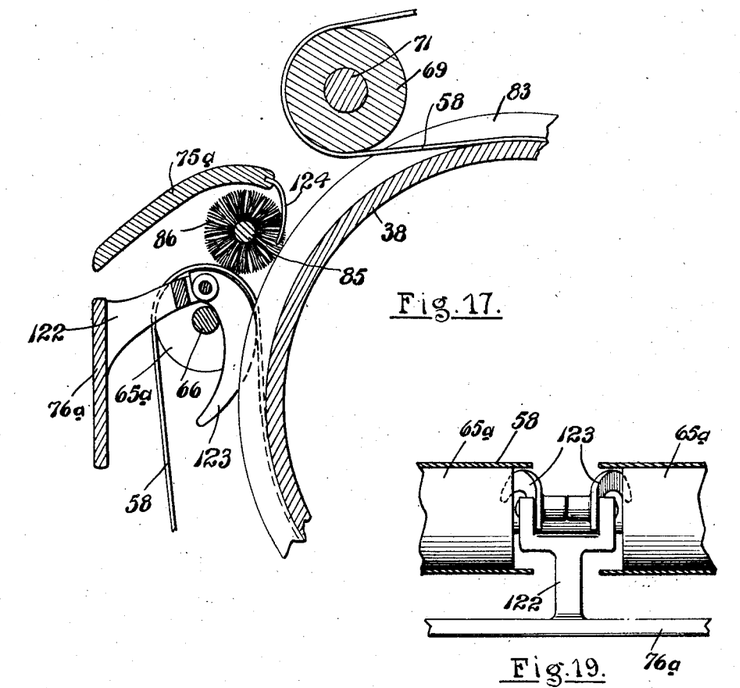
Fig. 17 is a fragmentary vertical section somewhat similar to Fig. 4 but showing some alterations in construction from that shown in Fig. 4.
Fig. 19 is a fragmentary plan view of the leaf controlling fingers for insuring against the ends of the leaves engaging under the belts adjacent the front rollers over which the belts pass.
Figure 18:
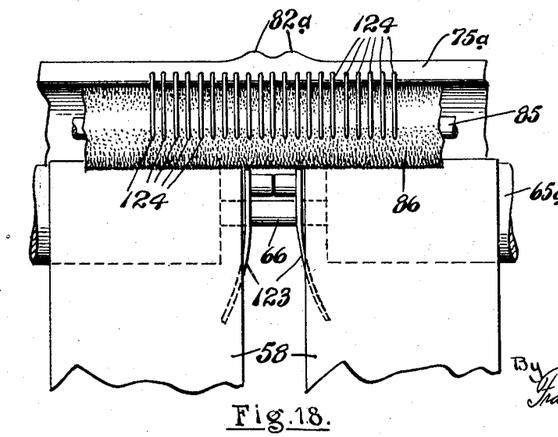
Fig. 18 is a fragmentary rear elevation of the feed table, brush and belts shown in Fig. 17.

In Figs. 17, 18 and 19 some modifications in the construction are shown and which, for various reasons, may be preferred. In this construction the block 77 and the operating mechanism therefor, consisting of the cam member 92 and the interposed elements for operating the block by said cam member, are eliminated and the table on which the leaves of tobacco are first spread out before feeding into the machine is furnished by the table 75ª on the upper side of which are the ribs 82ª with a groove between them serving the same purpose as the ribs 82 with the groove between on the block 77. This table and the bar 76ª, located below it, are attached to the arms 67 and the shaft 85 with the brush 86 therein are on said arms in the same manner as before described.

From the part 76ª shown a bracket 122 extends rearwardly, having a forked end between the arms of which are pivotally mounted two curved fingers 123, the same depending and lying between rollers 65ᵃ which replace the roller 65 mounted in the same manner on the shaft 66. In addition, from the inner edge of the table 75ᵃ a plurality of downwardly curved tines 124 extend, at their outer ends coming within the outer ends of the brush bristles of the brush 86.

These constructions are of utility in preventing fouling of the stemmed leaves of tobacco with the brush and with the belts 58. That is, the free ends of the stemmed leaves may have a tendency to catch underneath the edges of the belts 58 where passing around rollers 65ᵃ and are guided away therefrom by the guide fingers 123, while any tendency of said ends to follow upwardly and over the brush 86 is insured against by the tines 124 which prevent such movement. These constructions simplify the machine to a considerable extent and insure its operation without any possible entanglement or fouling the leaves with the belts or the brush 86.

This tobacco stemming and booking machine is relatively simple, compact, durable, efficient in every way and with it the stemming and booking of leaves of tobacco is relatively easy of accomplishment. The machine is controlled automatically in most of its phases of operation, is started by foot operation, stops automatically at the proper place or may be made to stop at other places whenever desired. The belts are continuously cleaned during the operations of the machine. The automatic outward movement of the leaf receiving block 77 when a leaf is to be applied thereto and the like automatic inward movement thereof when a leaf is to be entered into the machine is a feature of value, as well as the facility in which the leaves may be smoothed to place for entrance into the machine following from the formation of the upper surface of the table 75. In every way the machine is practical and has so proved in practice. The claims appended define the invention and all forms of structure coming within their scope are to be considered as comprehended by the invention.

I claim:

1. In a tobacco stemming and booking machine, a drum, means for driving the same, belts associated with the drum and passing partly around the same, stemming means mounted over the drum and acting to remove the stems from leaves of tobacco passed to the drum under the belts, means for automatically stopping the drum at the completion of a single revolution thereof, a movable leaf feeding means, and means for automatically controlling said feeding means to move the same toward the drum on starting rotation of the drum and away from the drum on the stopping thereof.

2. A machine of the character described, comprising a rotatably mounted drum, means for driving the same, an annular rib projecting from the drum, a roller mounted over the drum and having a grooved portion lying directly over the rib, belts passing around the roller and partly around the drum, and means for feeding leaves of tobacco into the machine under said roller and belts and over the drum and rib thereon.

3. A machine of the class described, comprising a rotatably mounted drum, a support therefor, a frame mounted on said support over the drum, a roller located over the drum and carried by the frame, said roller having an intermediate larger grooved stemming portion, a rib projecting from the drum directly under said grooved portion of the roller, two belts passing partly around the drum and around the roller, one at each side of the rib on the drum and one at each side of the grooved part on the roller, and means for driving the drum, substantially as described.

4. In a tobacco stemming machine, a rotatably mounted drum, a roller mounted for rotation thereover, said drum having an annular rib projecting therefrom, and said roller having an annular grooved portion projecting therefrom directly over the rib, and means for simultaneously driving the drum and roller, substantially as described.

5. In a machine of the class described, a supporting frame, a drum horizontally mounted between the sides thereof, an annular rib projecting from the drum between its ends, an overhead frame pivotally connected to the support, rollers mounted between the sides of the frame over the drum, each roller between its ends having a grooved annular projecting member lying directly over the rib, means for detachably securing the free end of the frame to the support to bring the grooved portions of the rollers against the rib, and means for driving the drum and rollers together, substantially as described.

6. A construction containing the elements in combination defined in claim 5, combined with movably mounted feeding means located at the front of the overhead frame, and means for automatically moving the feeding means inwardly under the free end of the frame to carry a tobacco leaf to the rib and the first of the rollers, substantially as described.

7. In a machine of the class described, a support having spaced apart sides, a drum rotatably mounted in horizontal position between the sides of the support, an annular rib projecting from the drum between its ends, an overhead frame pivotally connected to the support at one end, means for detachably connecting the free end of the overhead frame to the support, rollers carried horizontally by the frame, each having an annular grooved projecting portion between its ends lying directly over said rib, upper and lower rollers back of the drum carried by the support, a lower roller carried by the support below and at the front of the drum, a table frame pivotally mounted on the support at the front thereof, a roller mounted thereon in front of the drum, two belts passing around the major portion of the drum and engaging all of said rollers thereby leaving an entrance under the belts to the drum, means to drive the drum, and means carried by the table frame for feeding tobacco leaves into the machine under the belts and over the drum, said belts being located one at each side of the rib on the drum.

8. A construction containing the elements in combination defined in claim 7, combined with means for automatically stopping the drum at the completion of a complete revolution thereof, substantially as described.

9. A construction containing the elements in combination defined in claim 7, combined with means for automatically stopping the drum at the completion of a complete revolution thereof, and means for stopping the drum at any intermediate point in its revolution, substantially as described.

10. A construction containing the elements in combination defined in claim 7, combined with means for automatically stopping the drum at the completion of a revolution thereof, and foot operated means for releasing said stopping means to start the drum on a succeeding revolution.

11. A construction containing the elements in combination defined in claim 7, combined with a slidably mounted feeding means carried by the table frame, means for automatically stopping the drum at the completion of each revolution thereof, means for starting the drum in rotation for a succeeding revolution thereof, means for automatically moving the feeding means inwardly toward the drum at the beginning of a revolution thereof, and means for automatically moving the feeding means outward at the completion of a revolution of the drum and substantially at the stopping thereof.

12. A construction containing the elements in combination defined in claim 7, combined with means for releasably connecting the table frame to the support whereby the same may be moved to inner operative position and held therein, or moved outwardly about its pivots to open position, substantially as described.

13. In a machine of the class described, a support having spaced apart sides, a drum rotatably mounted in horizontal position between said sides, means for rotating the drum, means for automatically stopping the drum at the completion of each revolution thereof, stemming mechanism located above the drum and coacting with means on the drum for separating stems from leaves of tobacco fed to the stemming mechanism, a slidably mounted feed member on which the leaves may be spread prior to passage to the drum and stemming mechanism, means for carrying said feeding member inwardly substantially at the beginning of the rotation of the drum, and means for moving the feed member outwardly at the stopping of the movement of the drum, substantially as described.

14. In a machine of the class described, means for separating stems from leaves of tobacco to which the leaves are successively fed, a movably mounted feed member on which the leaves may be spread prior to feeding to said stem separating means, means for automatically moving the feed member toward said stem separating means on operation of said means, means for automatically stopping the stem separating means on completion of the stem separation operation on a leaf, and means for automatically moving the feed member outwardly substantially with the stopping of the stem separating means.

15. In a machine of the class described, a support, a drum rotatably mounted thereon, belts passing partly around the drum, an annular rib projecting from the drum, grooved rollers pressing against the rib on the drum, and means for driving the drum, whereby said belts are driven, said belts engaging with the rollers to drive the same, substantially as described.

16. In a machine of the class described, a support having spaced apart sides, stem separating means carried by the support into which tobacco leaves may be fed to separate the stems from the leaves including a rotatably mounted drum having an annular rib projecting therefrom and a grooved roller mounted adjacent the roller and pressing at its grooved portion against the rib, belts passing partly around the drum and over the roller one at each side of the rib, means back of the roller for guiding the stem separated from the leaf fed into the machine upwardly and away from the drum, and means for driving the drum, substantially as described.

17. In a machine of the class described, a support, stem separating means carried by the support into which tobacco leaves are adapted to be successively fed, a frame at the side of the support in front of the stem separating means, a block slidably mounted thereon for movements toward or away from the said stem separating means, means for periodically moving said block toward said stem separating means and holding it in said position for a time, and means for moving the block outwardly away from said means when it is released to permit said movement, substantially as described.

18. In a machine of the class described, rotatably mounted drum, stem separating means for tobacco leaves associated therewith, belts passing partly around the drum for holding the stemmed leaves against the drum, a support for the drum, a pivotally mounted frame at the front of the drum, a roller on the frame over which the belts pass, means for holding said frame at inner position serving to guide the belts on the drum, said means being operable to move the frame outwardly to loosen the belts and permit access to the stemmed leaves on the drum under the belts, means for driving the drum, means for automatically stopping the drum in a predetermined position after completion of a revolution thereof, a horizontal table on said frame, a slide feed member slidably mounted on the upper side of the table and movable inwardly and outwardly with respect to the drum, means for normally moving said feed member to one position with respect to the drum, and means for moving the feed member to the other position on starting of the drum in rotation, said last mentioned means becoming inoperative at the time of stopping the drum.

19. In a machine of the class described, a drum having an annular projecting rib thereon, a roller mounted to bear against the drum rib and having a grooved outer side for engagement with the edges of the rib, leaves of tobacco being fed through between the roller and the rib to separate the stem from the leaf, means for driving the drum and roller comprising belts passed around the drum and roller, a rotatably mounted brush adapted to contact with the belts, a feed table over the brush, and a comb comprising a plurality of fingers extending from the end of the feed table into the edges of the brush adjacent said rib on the drum, substantially as described.

20. In a machine of the class described, a drum having an annular projecting rib thereon, a roller mounted to bear against the drum rib having a grooved outer side for engagement with the edges of the rib, leaves of tobacco being fed through between the roller and the rib to separate the stem from the leaves, means for driving the roller comprising endless belts passing around the drum at each side of the rib, spaced apart rollers at one side of the drum over which the belts pass, between which rollers the leaves of tobacco are fed to the drum and under the belts, and curved fingers located adjacent the lower roller of said spaced apart rollers and having free ends curved inwardly within the planes of the inner adjacent edges of the belts, substantially as and for the purposes described.

In testimony whereof I affix my signature.

JOHN H. DEAN.